United States Patent [19]

Yamamuro

[11] Patent Number: 5,148,420
[45] Date of Patent: Sep. 15, 1992

[54] RECORDING INFORMATION APPARATUS HAVING A HEAD SPEED DETECTOR

[75] Inventor: Mikio Yamamuro, Kanagawa, Japan

[73] Assignee: Kabushiki Kaisha Toshiba, Kanagawa, Japan

[21] Appl. No.: 589,546

[22] Filed: Sep. 28, 1990

[30] Foreign Application Priority Data

Oct. 3, 1989 [JP] Japan .................................. 1-257098

[51] Int. Cl.$^5$ .............................................. G11B 7/00
[52] U.S. Cl. .............................. 369/44.11; 369/44.25; 369/32; 369/44.33; 360/77.03
[58] Field of Search ............... 369/44.11, 44.12, 44.13, 369/44.14, 44.15, 44.16, 44.17, 44.41, 44.42, 32, 54, 44.28, 44.27, 44.29, 44.31, 44.32, 44.33, 44.34, 44.25; 250/201.5; 360/78.04–78.14, 77.03

[56] References Cited

U.S. PATENT DOCUMENTS

| | | | |
|---|---|---|---|
| 4,302,830 | 11/1981 | Hamaoka et al. | 369/44.13 |
| 4,684,797 | 8/1987 | Ando et al. | 369/44.24 |
| 4,773,055 | 9/1988 | Gijzen et al. | 369/44.16 |
| 4,788,421 | 11/1988 | Ogawa et al. | 250/201.5 |
| 4,837,757 | 6/1989 | Okada et al. | 369/44.14 |
| 4,839,876 | 6/1989 | Fennema | 369/44.28 |
| 4,876,679 | 10/1989 | Mukai | 369/44.29 |
| 4,896,310 | 1/1990 | Wachi | 369/44.34 |
| 4,982,397 | 1/1991 | Yokota | 369/44.32 |
| 5,018,125 | 5/1991 | Uchikoshi et al. | 369/44.34 |
| 5,036,506 | 7/1991 | Bierhoff | 369/44.11 |

FOREIGN PATENT DOCUMENTS 59-175040 3/1983 Japan .................. 369/44.41

Primary Examiner—Roy N. Envall, Jr.
Assistant Examiner—Thai Tran
Attorney, Agent, or Firm—Finnegan, Henderson, Farabow, Garrett and Dunner

[57] ABSTRACT

A recording information apparatus for a recording medium having a track previously formed on the recording medium. The apparatus includes an objective lens for projecting a light beam on the optical disc, an optical head for carrying the objective lens, a photodetector for receiving reflected light from the optical disc and providing a reproduced signal indicative thereof, a circuit for generating a tracking error signal indicative of a deviation of the light beam from the center of a predetermined track in response to the reproduced signal from the photodetector, a tracking actuator for moving the objective lens in a direction perpendicular to the track in response to the tracking error signal, a drive motor for driving the optical head in the direction in response to the tracking error signal, a speed detector for detecting the moving speed of drive motor and providing a speed signal indicative thereof and a connection for suppressing the movement of the tracking actuator in response to the speed signal from the speed detector.

7 Claims, 7 Drawing Sheets

RECORDING INFORMATION APPARATUS HAVING A HEAD SPEED DETECTOR

FIELD OF THE INVENTION

The present invention relates generally to a recording information apparatus, and more particularly, to an apparatus for recording information on a recording medium.

BACKGROUND OF THE INVENTION

As is well known, many apparatus for recording information on a recording medium, such as an optical disc, have been developed.

In the recording information apparatus, a light beam is projected to an optical disc for recording or reproducing information to or from the optical disc by an optical head. The optical head is moved in the radial direction of the optical disc, while the optical disc rotates.

The recording information apparatus includes an objective lens for projecting the light beam onto the optical disc. Thus, the light beam is converged to the optical disc so that a spot of the light beam is formed on the surface of the optical disc. The recording information apparatus further includes a recording information apparatus for controlling the spot so that it follows a predetermined track on the optical disc. Such a tracking control of the spot is carried out by controlling positions of the objective lens with respect to the optical head and the optical head to with respect the optical disc in the radial direction of the optical disc using a tracking error signal detected from the light beam reflected from the optical disc. That is, a servo control system is established in the tracking control operation.

In the tracking control operation, the light beam reflected from the optical disc is applied to at least a pair of light detector cells provided in the optical head again passing through the objective lens. The light detector cells are separated from each other in the radial direction of the optical disc. Detected signals of the two light detector cells are subtracted from each other in a tracking error detector such as a differential amplifier. If the spot is offset from the center of the track, a relatively large error signal of the detected signals, i.e., a tracking error signal, is output from the tracking error detector. Such an offset of the spot from the predetermined track occurs due to dust on the optical disc or a mechanical shock applied to the recording information apparatus by an external force. That is, the objective lens and/or the optical head is shifted in the radial direction of the optical disc from its regulated position. The tracking error signal is applied to the recording information apparatus. The recording information apparatus moves either or both the objective lens and the optical head to reduce the offset of the spot from the predetermined track. Accordingly, the tracking of the spot to the predetermined track is secured.

In a conventional recording information apparatus, however, the tracking control operation is not sufficiently carried out in a case when the objective lens and/or the optical head has been rapidly shifted, because the servo control system of the tracking control operation diverges in the case of the rapid shift of the objective lens and/or the optical head.

SUMMARY OF THE INVENTION

It is, therefore, an object of the present invention to provide a recording information apparatus which is able to securely operate in a relatively rapid shift of objective lens and/or the optical head.

In order to achieve the above object, a recording information apparatus according to one aspect of the present invention for an optical disc having a track previously formed on the optical disc includes an objective lens for projecting a light beam on the optical disc, an optical head for carrying the objective lens, a photodetector for receiving reflected light from the optical disc and providing a reproduced signal indicative thereof, a circuit for generating a tracking error signal indicative of a deviation of the light beam from the center of a predetermined track in response to the reproduced signal from the photodetector, a tracking actuator for moving the objective lens in a direction perpendicular to the track in response to the tracking error signal, a drive motor for driving the optical head in the direction in response to the tracking error signal, a speed detector for detecting the moving speed of drive motor and providing a speed signal indicative thereof and a connection for suppressing the movement of the tracking actuator in response to the speed signal from the speed detector.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
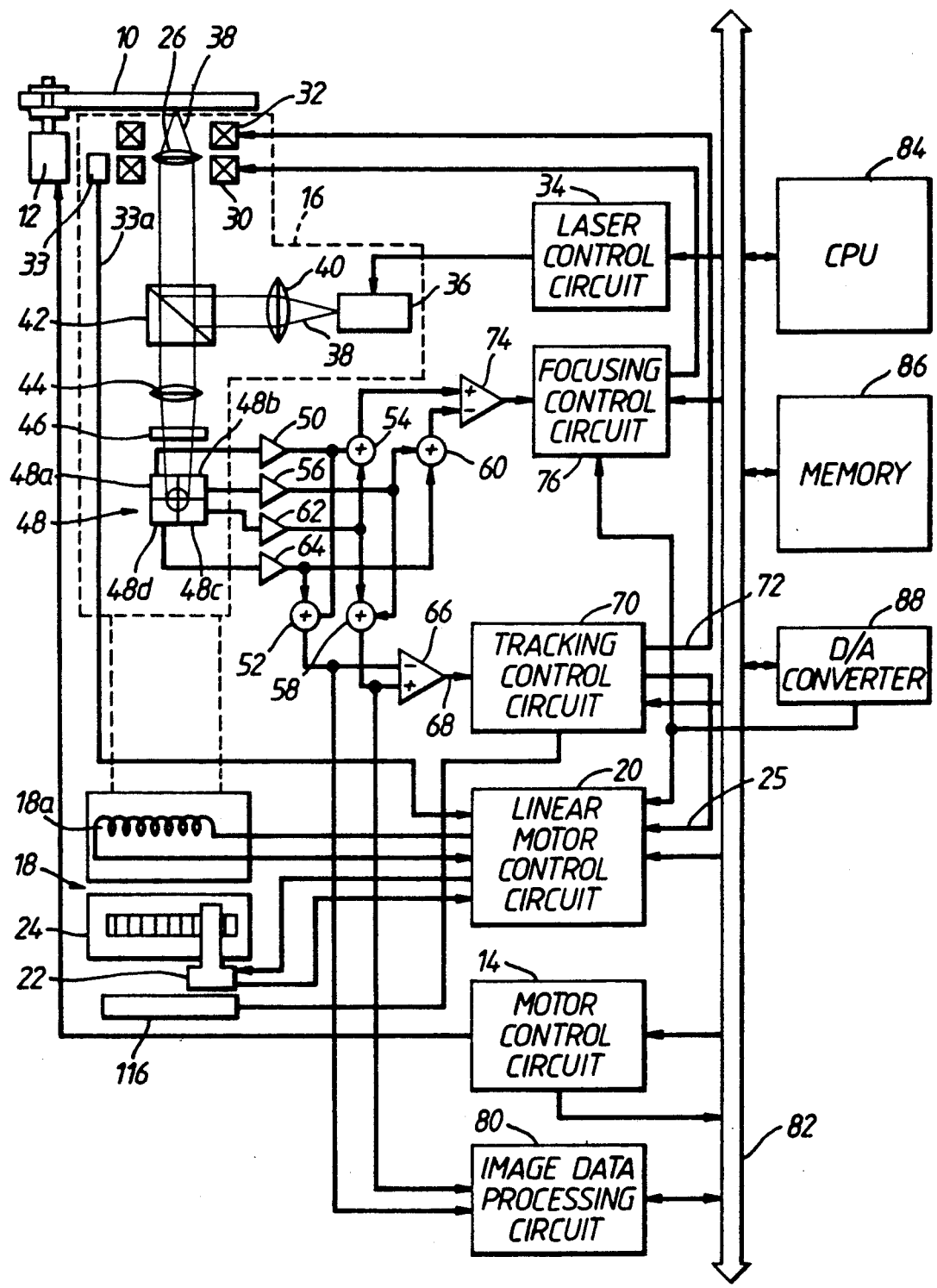
FIG. 1 is a block diagram showing an recording information apparatus which embodies a recording information apparatus according to the present invention.

The present invention will be described in detail with reference to the FIGS. 1 through 7e. Throughout the drawings, like or equivalent reference numerals or letters will be used to designate like or equivalent elements for simplicity of explanation.

Referring now to FIG. 1, a example of an recording information apparatus embodying the recording information apparatus according to the present invention will be described in detail. FIG. 1 shows a block diagram illustrating an overall system of the recording information apparatus.

In FIG. 1, information recording tracks are formed with substantially equal distance between them on the surface of an optical information disc 10 in a spiral fashion or in a concentric fashion. The optical information disc 10 is rotated at a prescribed constant speed by a disc drive motor 12. The rotation of the disc drive motor 12 is controlled by a motor control circuit 14.

Figure 2:
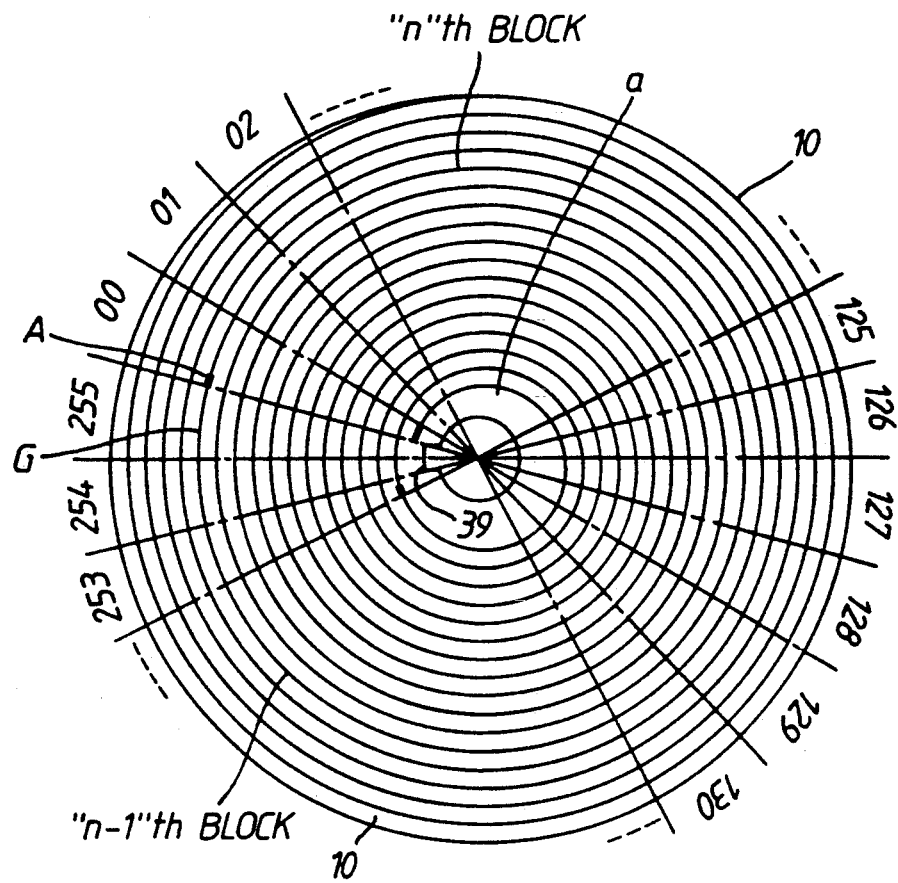
FIG. 2 is a plan view showing the construction of an optical disc.

Referring now to FIG. 2, the optical information disc 10 includes a circular base plate such as glass or plastic and a recording layer of tellurium or bismuth, that is, a metallic film layer is coated on the circular base plate. In the vicinity of the center of the metallic film layer, a notch or a reference position mark 39 is formed by wearing away a part of the metallic film layer. Also the surface of the optical information disc 10 is divided into 256 sectors of "0-255" taking the reference position mark 39 as "0".

On the optical information disc 10, information such as image information of variable length is recorded over a plurality of blocks, and information of 300,000 blocks is recorded in 36,000 tracks on the optical information disc 10. Also, the number of the sectors of one block on the optical information disc 10 is 40 on the inner side track and 20 on the outer side track. Further, when each block does not end at a border of neighboring blocks, a block gap G is provided so that each block always starts from the head end of a new sector, as shown by the "n−1"th block and "n"th block. On the head portion of the blocks, a block header A comprising a block number and a track number is previously recorded by a manufacturer of the optical information disc 10.

Referring back to FIG. 1, an optical head 16 serves to record information on the optical information disc 10, and to reproduce recorded information therefrom. The optical head 16 is fixed to a moving coil 18a which constitutes a movable unit of a linear motor 18. The moving coil 18a is connected to a linear motor control circuit 20. An optical head position detector 22 is connected to the linear motor control circuit 20. The position detector 22 detects an optical scale 24 provided on the optical head 16 so as to produce a signal indicative of the present position of the optical head 16. A permanent magnet (not shown) is provided in the stationary unit of the linear motor 18. Thus, when the moving coil 18a is energized by the linear motor control circuit 20, the optical head 16 roughly moves in the radial direction of the optical information disc 10.

Figure 3:
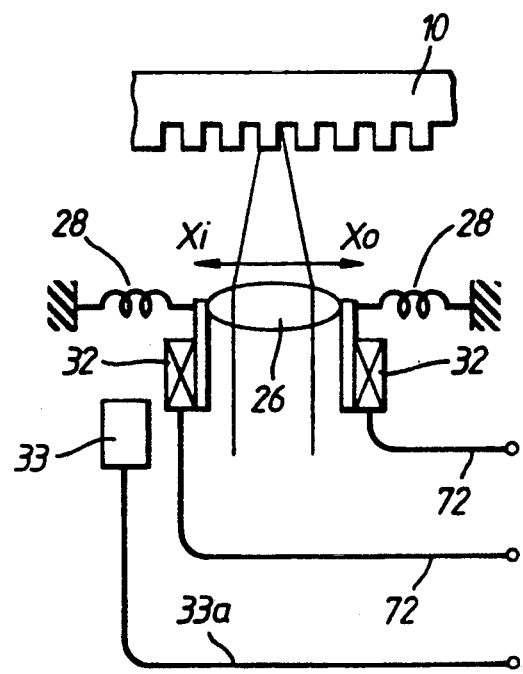
FIG. 3 is a schematic illustration of the optical head of FIG. 2.

As shown in FIG. 3, the optical head 16 comprises an objective lens 26 which is movably supported by a wire or a leaf spring. The objective lens 26 is moved by a focusing actuator coil 30 in a focusing direction (the optical axis direction of the objective lens 26). Further, the objective lens 26 is finely moved by a tracking actuator coil 32 in the radial direction of the optical information disc 10, in other words, the radial direction that intersects perpendicularly to the optical axis of the objective lens 26, as shown by arrows Xi, Xo in the drawing.

The optical head 16 further comprises a lens position detector 33. The lens position detector 33 detects the position of the objective lens 26 in the radial direction Xi-Xo from its standard position where the objective lens 26 is supported by the wire or the leaf spring without any other influences.

A lens position signal output from the lens position detector 33 is applied to the linear motor control circuit 20. The linear motor control circuit 20 moves the optical head 16 when the lens position signal exceeds a predetermined level. Thus, when the objective lens 26 shifts for a relatively long distance in the radial direction Xi-Xo the optical head 16 shifts by the same distance in the same direction so that the objective lens 26 is returned from its shifted position to the standard position.

Referring again to FIG. 1, the optical head 16 includes a semiconductor laser 36. The semiconductor laser 36 is operated in accordance with signals produced from a laser control circuit 34. A light beam 38 emitted from the semiconductor laser 36 is applied to an objective lens 26 through a collimator lens 40 and a half prism 42. Then the objective lens 26 projects the light beam 38 to the optical information disc 10. Further, the light beam 38 reflected from the optical information disc 10 is fed into an optical detector 48 through the objective lens 26, the half prism 42, a focusing lens 44 and a cylindrical lens 46.

The optical detector 48 consists of four partitioned light detector cells 48a, 48b, 48c and 48d. The output signals of the light detector cells 48a, 48b, 48c and 48d are respectively fed into amplifiers 50, 56, 62 and 64. The output signal from the amplifier 50 is fed into one input of an adder 54 and also into one input of an adder 52. Further, the output signal from the amplifier 56 is fed into one input of an adder 58 and also into one input of an adder 60. The output signal of the amplifier 62 is fed into the other input of the adder 54 and also into the other input of the adder 58. The output signal of the amplifier 64 is fed into the other input of the adder 52 and also into the other input of the adder 60.

An output signal from the adder 52 and an output signal from the adder 58 are respectively fed into an inverting input and a non-inverting input of an operational amplifier 66. Thus, the operational amplifier 66 produces a tracking error signal. The tracking error signal output from the operational amplifier 66 is fed into a tracking control circuit 70. The tracking control circuit 70 produces a tracking control signal. The tracking control signal is then applied to the tracking actuator coil 32 and the linear motor control circuit 20.

Here, assume that the optical head 16 has achieved access to the desired track by the action of the linear motor 18. The tracking control circuit 70 produces a drive signal which is supplied to the tracking actuator coil 32 provided in the optical head 16. Thus, the objective lens 26 is moved so as to precisely oppose the desired track. As a result, the light beam 38 is moved accurately to the desired track (later described in detail).

An output signal from the adder 54 is fed into an inverting input of an operational amplifier 74. Further, an output signal from the adder 60 is fed into a non-inverting input of the operational amplifier 74. As a result, the operational amplifier 74 produces a focusing error signal proportional to the difference between the output signals of the adders 54 and 60. The focusing error signal output from the operational amplifier 74 is fed into a focusing control circuit 76. The focusing control circuit 76 produces a focusing control signal. The focusing control signal is fed into the focusing actuator coil 30. As a result, the light beam 38 emitted from the semiconductor laser 36 is precisely focused on the surface of the optical information disc 10. The focusing and tracking of the objective lens 26 are performed in the above-described manner.

The output signals from the adders 52 and 58 are applied into an image data processing circuit 80 and then combined together. Thus, a signal representing the sum of the respective output signals of the light detector cells 48a through 48d is applied to the image data processing circuit 80 so as to precisely correspond to the presence of pits (i.e., recorded information) on the surface of the optical information disc 10. The image data processing circuit 80, in turn, reproduces a data signal representing both image information and address information (e.g., track number, sector number etc.).

The laser control circuit 34, the focusing control circuit 76, the tracking control circuit 70, the linear motor control circuit 20, the motor control circuit 14 and the image data processing circuit 80 are connected to a CPU (central processing sector) 84 through a bus line 82. The CPU 84 controls these circuits in accordance with a prescribed program stored in a memory 86. Further, the focusing control circuit 76, the tracking control circuit 70, and the linear motor control circuit 20 are controlled in accordance with signals produced from a D/A (digital-to-analog) converter 88.

Figure 4:
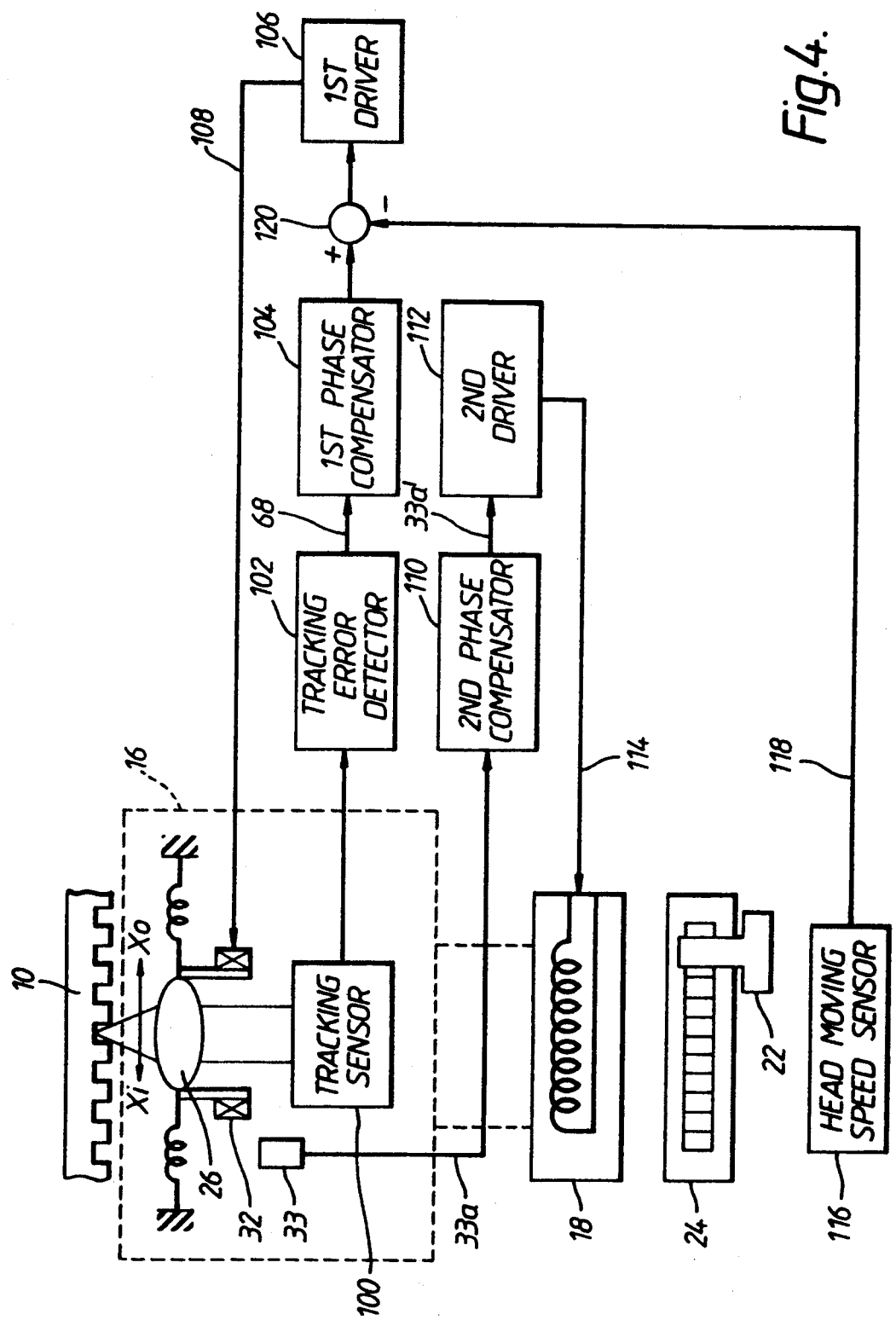
FIG. 4 is a schematic illustration of the recording information apparatus according to the present invention.

Referring now to FIG. 4, the detail of the recording information apparatus and its operation will be described. As shown in FIG. 4, the recording information apparatus includes the objective lens 26, a tracking sensor 100, the tracking error detector 102, a first phase compensator 104, an adder 120, a first driver 106 and the tracking actuator coil 32. The tracking sensor 100 is an optical system including a half prism, a focusing lens, a cylindrical lens and the optical detector 48 (see FIG. 1).

The light beam 38 reflected from the optical information disc 10 is fed into the tracking sensor 100. The tracking sensor 100 outputs a pair of signals whose difference reflects an offset of the light beam 38 from a predetermined track in the radial direction Xi-Xo. The tracking error detector 102 outputs the tracking error signal 68 in response to the difference of the signals. The first phase compensator 104 compensates a phase shift of the tracking error signal 68. The phase compensated tracking error signal 68 is applied to the first driver 106 through the adder 120. The first driver 106 drives the tracking actuator coil 32 in response to the phase compensated tracking error signal 68. Thus, the objective lens 26 moves in the direction Xi or Xo so as to reduce the offset of the light beam 38 from the center of the predetermined track.

A radial shift of the objective lens 26 from the standard position is detected by the lens position detector 33. The lens position detector 33 applies a lens position signal 33a representing the radial shift of the objective lens 26 to a second driver 112 through a second phase compensator 110. The second phase compensator 110 compensates a phase shift of the lens position signal 33a. The second driver 112 drives the moving coil 18a of the linear motor 18.

Further, the recording information apparatus includes a head moving speed sensor 116. The head moving speed sensor 116 detects the moving speed of the optical head 16 according to the changing rate of the head position indicating signal output from the head position detector 22. A head speed signal 118 output from the head moving speed sensor 116 is applied to the first driver 106 through the adder 120. Thus, the first driver 106 also controls the objective lens 26 in response to the head speed signal 118. The head speed signal 118 is applied to the adder 120 in the phase opposite to the phase of the tracking error signal 68. Thus, tracking error signal 68 and the head speed signal 118 cause the objective lens 26 to move in opposite directions, as referred again later.

Figure 5:
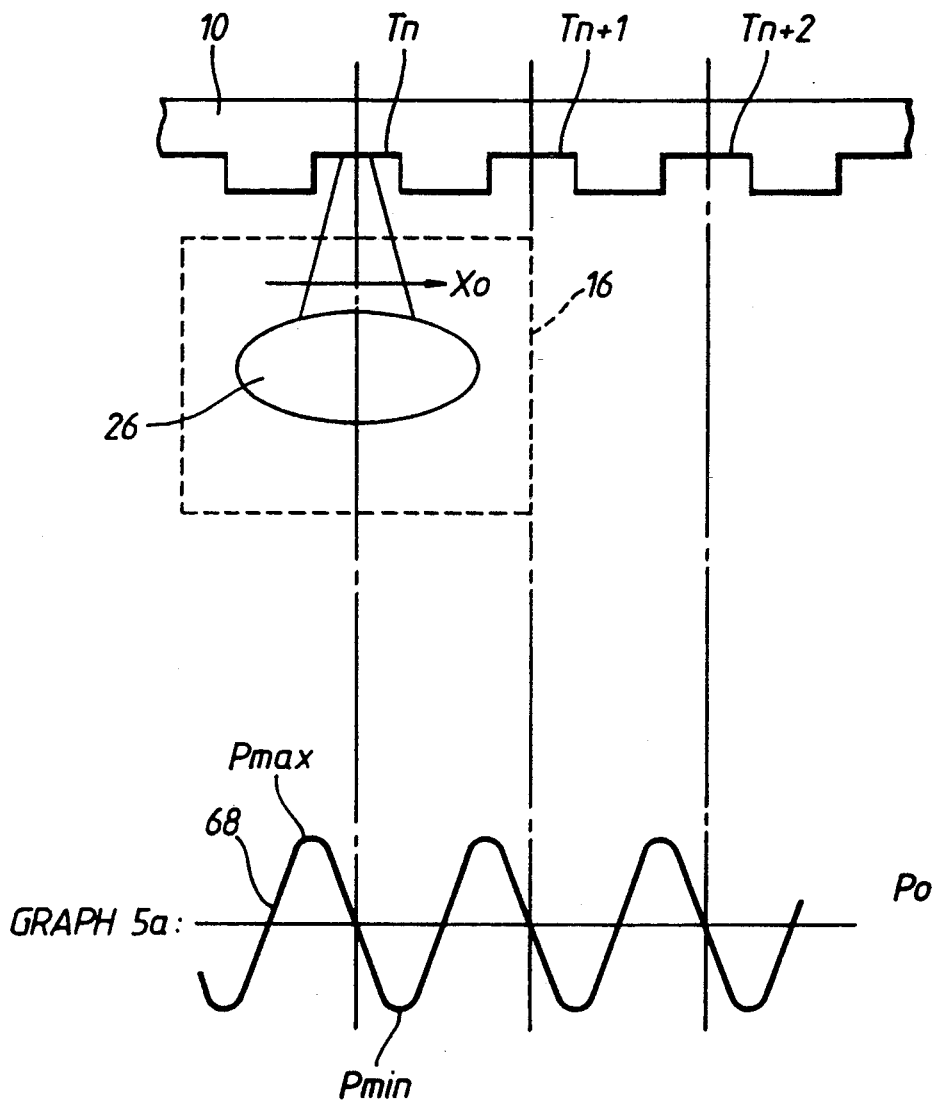
FIG. 5 is a schematic illustration for explaining the operation of the recording information apparatus according to the present invention.

Referring now to FIG. 5, a tracking operation of the objective lens 26 in the movement toward the radial direction Xo will be described. If it is assumed that the objective lens 26 moves across a number of tracks Tn, Tn+1, Tn+2, . . . etc., a tracking error signal 68, as shown in Graph 5a, is output from the tracking error detector 102. Such a track crossing operation of the objective lens 26 occurs, for example, in a track search mode or due to dust on the optical information disc 10 or a mechanical shock applied to objective lens 26. As seen from the Graph 5a, the tracking error signal 68 takes a reference level P0 when the light beam 38 is positioned in the center of each track Tn, Tn+1, Tn+2, . . . etc., and also in the center of each of inter-track sections of the track Tn, Tn+1, Tn+2, . . . etc. However, the tracking error signal 68 takes a minimum level Pmin when the light beam 38 shifts to rightward edges of the tracks Tn, Tn+1, Tn+2, . . . etc. The tracking error signal 68 takes a maximum level Pmax when the light beam 38 further shifts to leftward edges of the tracks Tn, Tn+1, Tn+2, . . . etc, passing through the inter-track sections.

In the usual tracking operation, the objective lens 26 is regulated to restore the light beam 38 to the center of the predetermined track, e.g., the track Tn, according to a servo control system including the objective lens 26, the tracking sensor 100, the tracking error detector 102, the first phase compensator 104, the adder 120, the first driver 106 and the tracking actuator coil 32.

Figure 6A:
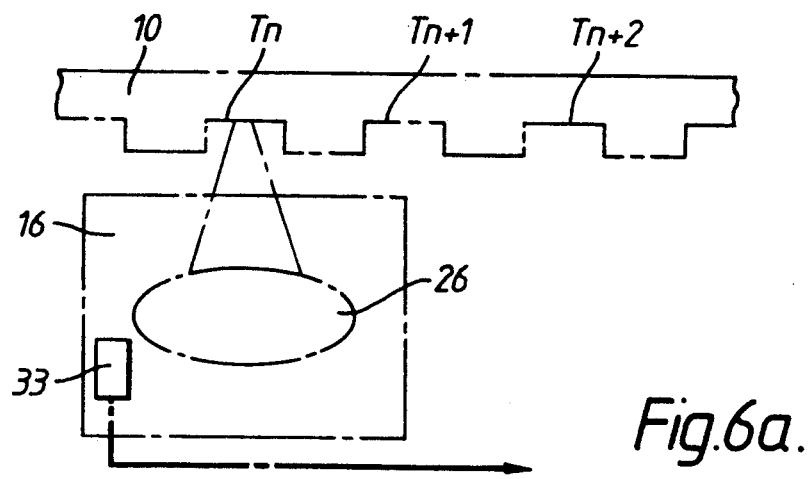
FIGS. 6a and 6b are schematic illustrations for explaining the operation of the recording information apparatus when the track has shifted.
Figure 6B:
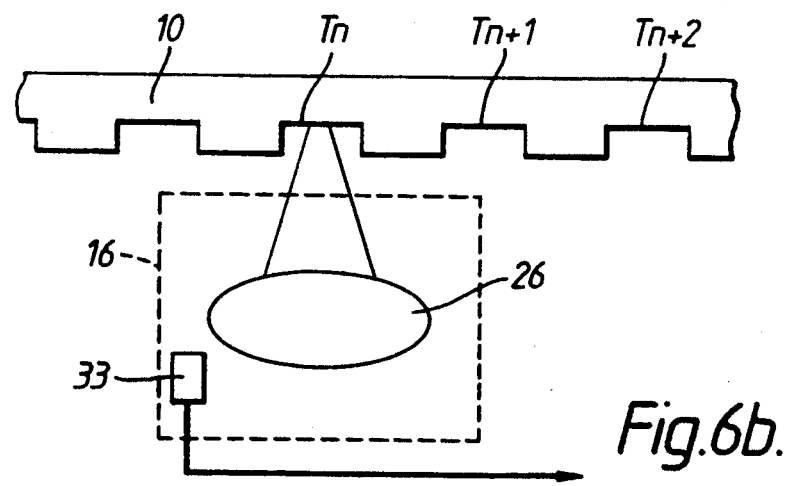

Referring now to FIGS. 6a and 6b, the tracking operation of the objective lens 26 when the track Tn has shifted in the direction toward the outward radial direction Xo will be described. This may be caused, for example, by an eccentricity of the optical information disc 10. In this case, the predetermined track Tn shifts from the position of FIG. 6a to another position of FIG. 6b. Then, the objective lens 26 is shifted in the same direction to follow the movement of the track Tn, since the objective lens 26 is so controlled that the tracking error signal 68 is maintained to the reference level P0 (see Graph 5a in FIG. 5). Herein, the objective lens 26 is shifted from its standard position in the optical head 16. Thus, the lens position detector 33 generates a lens position signal 33a representing the shift of the objective lens 26. The lens position signal 33a is applied to the second driver 112 through the second phase compensator 110. The second driver 112 drives the moving coil 18a of the linear motor 18 to move the optical head 16 in the same direction Xo. Thus, the deviation of the objective lens 26 from the standard position is eliminated.

As described above, the position of the objective lens 26 is controlled by the servo control system including the objective lens 26, the tracking sensor 100, the tracking error detector 102, the first phase compensator 104, the adder 120, the first driver 106 and the tracking actuator coil 32, so that the tracking error signal 68 is maintained to the reference level P0. On the other hand, the position of the optical head 16 is also controlled so that the lens position signal 33a detected by the lens position detector 33 is maintained to a reference level (referred to as Q hereinafter) corresponding to the original position of the objective lens 26 regulated by only the wire or the leaf spring.

Figure 7A:
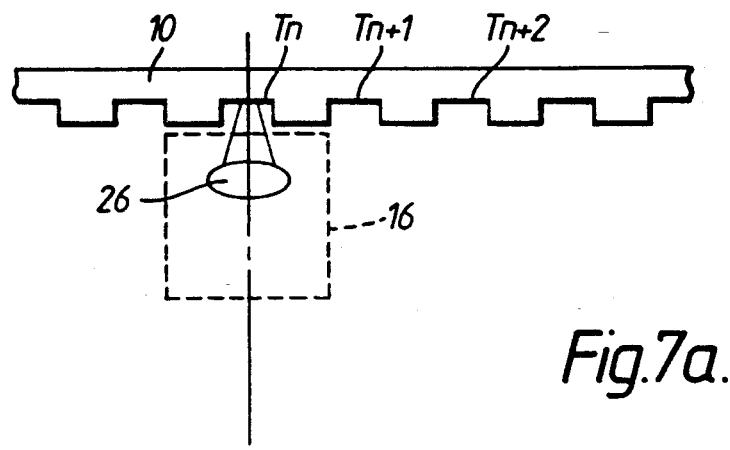
FIGS. 7a through 7e are schematic illustrations for explaining the operation of the recording information apparatus when an abrupt movement between the objective lens 26 and the optical disc 10 has occurred.
Figure 7B:
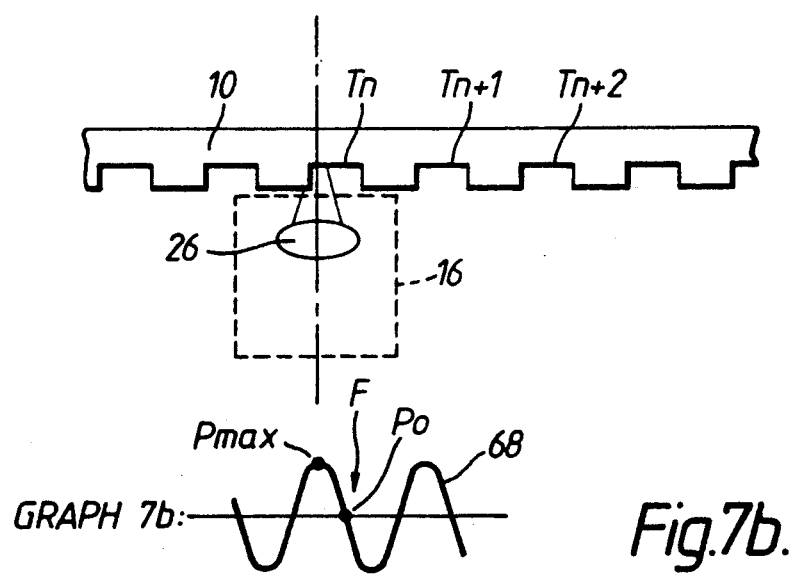
Figure 7C:
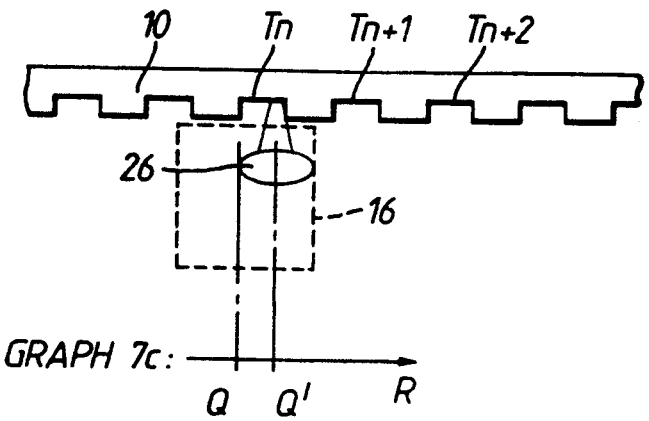
Figure 7D:
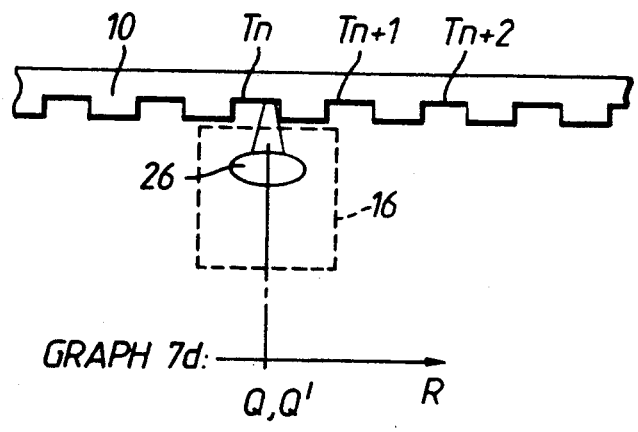

Referring now to FIGS. 7a through 7e, the tracking operation of the objective lens 26 when relative movement between the objective lens 26 and the optical disc 10 has abruptly occurred due to a mechanical shock or a relatively severe damage such as a crack or a flaw will be described. FIG. 7a shows the state wherein the optical lens 26 just faces the center of a predetermined track Tn, before the application of such a mechanical shock. Thus, in this state the lens position signal 33a detected by the lens position detector 33 is maintained at the reference level Q. When such a mechanical shock is applied to the optical lens 26, for example the optical lens 26 abruptly moves in the direction Xo. Then the objective lens 26 faces the left edge of the track Tn, as shown in FIG. 7b. In this state the tracking error signal 68 takes the maximum level Pmax (see Graph 7b). According to the tracking error signal 68 with the maximum level Pmax, a tracking control with a relatively large force is carried out to reduce the tracking error signal 68 in the direction F toward the reference level PO (see also Graph 7b). However, such an excess tracking control causes the objective lens 26 to overrun the center of the track Tn, as shown in FIG. 7c. In this occasion the objective lens 26 deviates rightwardly in the optical head 16. Thus, the lens position signal 33a takes an instantaneous level Q' corresponding to the deviated lens position (see Graph 7c). The lens position signal 33a with the instantaneous level Q' is applied to the second driver 112 through the second phase compensator 110 (see FIG. 4). The second driver 112 drives the moving coil 18a of the linear motor 18 to reduce the instantaneous level Q' of the lens position signal 33a to the reference level Q. Then the optical head 16 is shifted in the direction Xo following the overrunning objective lens 26, as shown in FIG. 7d. Thus, the instantaneous level Q' of the lens position signal 33a matches with the reference level Q (see Graph 7d).

Figure 7E:
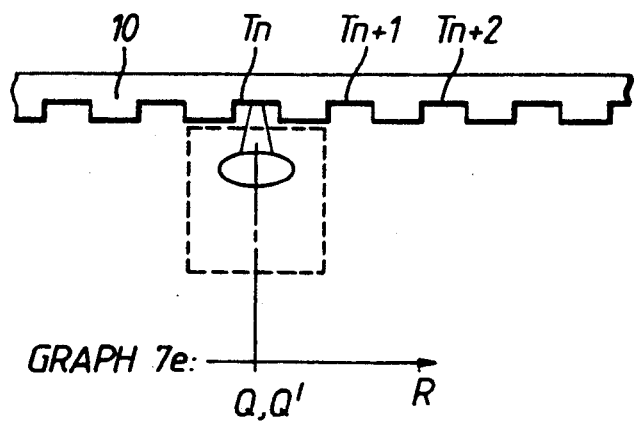

In the above operation, it is of concern that the objective lens 26 not run out of the track Tn in response to the excess tracking control of the tracking error signal 68, because the objective lens 26 and the optical head 16 are rapidly shifted in the direction Xo. However, the head moving speed sensor 116 outputs the head speed signal 118 with a relatively high level in response to the rapid movement of the optical head 16 (see FIG. 4). The head speed signal 118 is applied to the first driver 106 through the adder 120. Then, the first driver 106 drives the objective lens 26 in the leftward direction Xi through the tracking actuator coil 32, because the head speed signal 118 has a phase opposite to the tracking error signal 68, as described before. The head speed signal 118 suppresses the excess tracking control of the tracking error signal 68. As a result, the objective lens 26 can be restored to the position facing the center of the track Tn, as shown in FIG. 7e. In this state the instantaneous level Q' of the lens position signal 33a again matches with the reference level Q (see Graph 7e).

Advantageously, use of the head speed signal 118 as described can save time in restoring the objective lens 26 to the regulated position, because deviation of the objective lens 26 from the center of the track Tn is also suppressed by the head speed signal 118.

As described above, the present invention can provide an extremely preferable recording information apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A recording information apparatus for a recording medium having a track previously formed on the recording medium comprising:
   movable means for projecting a light beam on the recording medium;
   movable means for carrying the light projecting means;
   means for receiving reflected light from the recording medium and providing a reproduced signal indicative thereof;
   means for generating a tracking error signal indicative of a deviation of the light beam from the center of a predetermined track in response to the reproduced signal from the light receiving means;
   first detecting means for detecting a moving speed of the carrying means and providing a speed signal indicative thereof;
   adding means, connected to receive the tracking error signal and the speed signal, for producing an output signal representing a difference between the tracking error signal and the speed signal; and
   first moving means for moving the light projecting means in a direction perpendicular to the track in response to the output signal from the adding means.

2. A recording information apparatus of claim 1, further comprising:
   second detecting means for detecting the position of the light projecting means with respect to the carrying means and providing a positional signal indicative thereof; and
   second moving means for moving the carrying means in the direction perpendicular to the track in response to the position signal.

3. A recording information apparatus of claim 1, wherein the first detecting means generates the speed signal in response to a signal generated by a detector which determines the position of the carrying means.

4. A recording information apparatus of claim 1, wherein the light projecting means is adjusted based on the tracking error signal in conjuction with the speed signal.

5. A method of controlling the tracking of a light beam on a recording medium, comprising the steps of:
   projecting the light beam onto the recording medium, the light beam being movable across a surface of the recording medium;
   receiving light reflected from the recording medium;

generating a tracking error value indicative of a deviation of the light beam from its standard position;

generating a speed value corresponding to a moving speed of the light beam;

producing an output value representing a difference between the tracking error value and the speed value; and moving the light beam position in response to the output value.

6. A recording information apparatus for a recording medium having a track previously formed on the recording medium, the apparatus comprising:

light projecting means for projecting a light beam onto a prescribed track of the recording medium;

supporting means for supporting the light projecting means at a prescribed location, the supporting means being movable across the prescribed track;

position detecting means for detecting the position of the light projecting means when the light projecting means has been shifted from the prescribed location;

moving means, responsive to the position detected by the position detecting means, for moving the light projecting means to the prescribed location;

speed detecting means, responsive to the position detected by the position detecting means, for detecting the speed of the supporting means;

deviation detecting means, responsive to the light beam when it is reflected from the recording medium, for detecting a deviation of the projected light beam from the prescribed track;

adding means, connected to receive speed information representing the speed detected by the speed detecting means and deviation information representing the deviation detected by the deviation detecting means, for producing output information representing a difference between the speed information and the deviation information; and means, responsive to the output information, for moving the light projecting means so that the projected light beam falls onto the prescribed track.

7. A recording information apparatus for a recording medium having a track previously formed on the recording medium, the apparatus comprising:

light projecting means for projecting a light beam on a prescribed track of the recording medium;

carrying means for carrying the light projecting means;

positional reference providing means for providing a positional reference of the carrying means;

first supporting means for supporting the light projecting means on a prescribed position of the carrying means, the first supporting means being movable across the prescribed track;

second supporting means for supporting the carrying means, the second supporting means being movable across the prescribed track;

positional information outputting means, responsive to the positional reference providing means, for outputting positional information of the carrying means;

speed information outputting means, responsive to the positional information output from the positional information outputting means, for outputting speed information of the carrying means;

moving means for moving the first supporting means across the prescribed track;

position detecting means for detecting the position of the projecting means when the projecting means has been shifted from the prescribed location, and for outputting positional information corresponding to the detected position of the projecting means;

light beam detecting means for detecting at least one light beam reflected from the recording medium and for outputting deviation information representing a deviation of the projected light beam from the prescribed track;

driving means, responsive to the positional information output from the position detecting means, for driving the supporting means so that the carrying means moves the projecting means to the prescribed location;

adding means, connected to receive the speed information output from the speed information outputting means and the deviation information output from the light beam detecting means, for producing output information representing a difference between the speed information and the deviation information; and driving means, responsive to the output information, for driving the moving means so that the light projecting means moves in a direction reducing the deviation of the projected light beam from the prescribed track and so that a projected light beam falls onto the prescribed track.

* * * * *